(12) United States Patent
Olivadese et al.

(10) Patent No.: US 11,879,789 B2
(45) Date of Patent: Jan. 23, 2024

(54) ON-CHIP THERMOMETER FOR SUPERCONDUCTING QUANTUM COMPUTING DEVICES

(71) Applicant: International Business Machines Corporation, Armonk, NY (US)

(72) Inventors: Salvatore Bernardo Olivadese, Stamford, CT (US); Daniela Florentina Bogorin, Syracuse, NY (US); Nicholas Torleiv Bronn, Long Island City, NY (US); Sean Hart, Tarrytown, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 860 days.

(21) Appl. No.: 16/460,572

(22) Filed: Jul. 2, 2019

(65) Prior Publication Data
US 2021/0003457 A1 Jan. 7, 2021

(51) Int. Cl.
| | | |
|---|---|---|
| G01K 7/00 | (2006.01) | |
| G06N 10/00 | (2022.01) | |
| G06F 30/367 | (2020.01) | |
| H01P 7/08 | (2006.01) | |
| H01P 7/10 | (2006.01) | |
| G06F 119/08 | (2020.01) | |

(52) U.S. Cl.
CPC ........... *G01K 7/006* (2013.01); *G06F 30/367* (2020.01); *G06N 10/00* (2019.01); *H01P 7/082* (2013.01); *H01P 7/10* (2013.01); *G06F 2119/08* (2020.01)

(58) Field of Classification Search
CPC ...... G01K 7/006; G01K 2217/00; G01K 7/36; G01K 7/32; G06F 30/367; G06F 2119/08; G06F 30/20; G06N 10/00; H01P 7/08; H01P 7/10; H01P 7/082; H01L 27/18
USPC .......................................................... 374/176
See application file for complete search history.

(56) References Cited

U.S. PATENT DOCUMENTS

| | | |
|---|---|---|
| 4,869,598 A | 9/1989 | McDonald |
| 5,309,117 A | 5/1994 | Cadotte, Jr. et al. |
| 5,818,097 A | 10/1998 | Rohlfing et al. |

(Continued)

FOREIGN PATENT DOCUMENTS

| | | |
|---|---|---|
| CN | 103493025 A | 1/2014 |
| CN | 109685216 A | 4/2019 |

(Continued)

OTHER PUBLICATIONS

Olivadese, et al. "Controlling a Quantum Computing Device Based on Predicted Operation Time." U.S. Appl. No. 16/727,157, filed Dec. 26, 2019. 48 pages.

(Continued)

*Primary Examiner* — Suchin Parihar
(74) *Attorney, Agent, or Firm* — Amin, Turocy & Watson, LLP

(57) ABSTRACT

Techniques regarding determining the temperature of one or more quantum computing devices are provided. For example, one or more embodiments described herein can comprise a system, which can comprise a temperature component that can determine a temperature of a superconducting resonator based on a frequency shift exhibited by the superconducting resonator due to a change in kinetic inductance with a change in temperature.

16 Claims, 12 Drawing Sheets

(56) References Cited

U.S. PATENT DOCUMENTS

| | | | |
|---|---|---|---|
| 9,292,642 | B2 | 3/2016 | Herr et al. |
| 9,383,254 | B1* | 7/2016 | U-yen .................... H01L 39/10 |
| 9,523,777 | B2 | 12/2016 | Cecil et al. |
| 10,061,883 | B2 | 8/2018 | Shauck et al. |
| 10,140,404 | B2 | 11/2018 | Rigetti et al. |
| 10,145,743 | B2* | 12/2018 | Timofeev ................ H01L 37/00 |
| 10,147,865 | B1* | 12/2018 | Tahan .................... H01L 39/025 |
| 10,706,187 | B1* | 7/2020 | Ehrlund .................. G06F 30/20 |
| 10,833,652 | B1* | 11/2020 | Olivadese ............... H01P 7/00 |
| 11,048,846 | B2* | 6/2021 | Solgun ................... G06F 30/367 |
| 11,281,524 | B1* | 3/2022 | Egger .................... G06F 11/0706 |
| 11,317,519 | B2* | 4/2022 | Abdo ..................... H01P 11/001 |
| 11,501,196 | B2* | 11/2022 | Frisch .................... G06N 10/00 |
| 2003/0227349 | A1* | 12/2003 | Matsui ................... H01P 1/20327 |
| | | | 333/202 |
| 2006/0103583 | A1* | 5/2006 | Kleismit ................ B82Y 20/00 |
| | | | 343/785 |
| 2010/0304977 | A1 | 12/2010 | Sadleir |
| 2012/0105177 | A1* | 5/2012 | McLaren ............... G02F 1/0147 |
| | | | 333/17.1 |
| 2015/0293236 | A1* | 10/2015 | Cecil ..................... G01T 1/1606 |
| | | | 216/13 |
| 2016/0047763 | A1* | 2/2016 | Omichi ................. G01K 13/006 |
| | | | 374/161 |
| 2016/0328512 | A1* | 11/2016 | Chen ..................... G06F 30/367 |
| 2017/0173262 | A1* | 6/2017 | Veltz ..................... G16H 20/17 |
| 2018/0157775 | A1 | 6/2018 | Ronagh et al. |
| 2019/0007051 | A1* | 1/2019 | Sete ...................... H03K 19/195 |
| 2019/0042677 | A1 | 2/2019 | Matsuura et al. |
| 2019/0042966 | A1 | 2/2019 | Hogaboam et al. |
| 2019/0044542 | A1 | 2/2019 | Hogaboam et al. |
| 2020/0120812 | A1* | 4/2020 | Abdo ..................... H01P 5/12 |
| 2020/0202248 | A1* | 6/2020 | Mezzacapo ............ G06N 10/00 |
| 2020/0411937 | A1* | 12/2020 | Whittaker .............. B82Y 10/00 |
| 2021/0003456 | A1* | 1/2021 | Olivadese ............... G06F 30/20 |
| 2021/0003457 | A1* | 1/2021 | Olivadese ............... G06N 10/00 |
| 2021/0013391 | A1* | 1/2021 | Johnson ................. H01L 39/025 |
| 2021/0057631 | A1* | 2/2021 | Swenson ................ H01L 39/223 |
| 2021/0190885 | A1* | 6/2021 | Swenson ................ G01R 33/0094 |
| 2021/0257995 | A1* | 8/2021 | Sun ....................... H03J 3/22 |
| 2021/0350268 | A1* | 11/2021 | Whittaker .............. H03B 15/00 |
| 2022/0101171 | A1* | 3/2022 | Chen ..................... H01L 39/223 |
| 2022/0131254 | A1* | 4/2022 | Schuster ................ G06N 10/20 |
| 2022/0328747 | A1* | 10/2022 | Griggio .................. H10N 60/12 |

FOREIGN PATENT DOCUMENTS

| | | | |
|---|---|---|---|
| DE | 102017011351 | A1 | 6/2018 |
| EP | 1912259 | A1 | 4/2008 |
| JP | 200520171 | A * | 1/2003 |
| KR | 20190009064 | A | 1/2019 |
| WO | 2014135749 | | 9/2014 |
| WO | 2018064535 | | 4/2018 |
| WO | WO-2020180885 | A1 * | 9/2020 |

OTHER PUBLICATIONS

International Search Report and Written Opinion for International Application Serial No. PCT/EP2020/068395 dated Oct. 13, 2020, 12 pages.

International Search Report and Written Opinion for International Application Serial No. PCT/EP2020/068402 dated Oct. 14, 2020, 15 pages.

Song et al., "10-qubit entanglement and parallel logic operations with a superconducting circuit", Mar. 30, 2017, 16 pages.

Zajac et al., "Impact of floorplanning and thermal vias placement on temperature in 2D and 3D processors", Microelectronics Journal, vol. 52, Mar. 28, 2016, pp. 40-48.

Frunzio et al., "Fabrication and characterization of superconducting circuit QED devices for quantum computation", Confirmation No. 1357 Session ID 3EI07, Nov. 28, 2004, 4 pages.

Yeh et al., "Microwave attenuators for the use with quantum devices below 100mK." Journal of Applied Physics, 121(22), 224501. https://doi.org/10.1063/1.4984894 (2017). 8 pages.

Audley et al., "A prototype kinetic inductance thermometer for X-ray calorimetry." Journal of Low Temperature Physics, 93(3-4), 245-250. https://doi.org/10.1007/bf00693427 (1993). 6 pages.

Rauch et al., "Microwave properties of YBa2Cu3O7-xthin films studied with coplanar transmission line resonators." Journal of Applied Physics, 73(4), 1866-1872. https://doi.org/10.1063/1.353173 (1993). 8 pages.

Meservey et al., "Measurements of the Kinetic Inductance of Superconducting Linear Structures." Journal of Applied Physics, 40(5), 2028-2034. https://doi.org/10.1063/1.1657905 (1969). 8 pages.

Devalapalli. "Thermal Activation of Superconducting Josephson Junctions." Massachusetts Institute of Technology (2007). 75 pages.

Mell, Peter, et al. "The NIST Definition of Cloud Computing." National Institute of Standards and Technology. Sep. 2011. 7 pages.

Hui, et al. "QC—How to build a Quantum Computer with Superconducting Circuit?" Medium.com. https://medium.com/@jonathan_hui/qc-how-to-build-a-quantum-computer-with-superconducting-circuit-4c30b1b296cd. Last Accessed Jun. 5, 2019. 25 pages.

Non-Final Office Action received for U.S. Appl. No. 16/460,457 dated Oct. 6, 2022, 65 pages.

Notice of Allowance received for U.S. Appl. No. 16/460,457 dated Jan. 24, 2023, 114 pages.

List of IBM Patents or Applications Treated as Related.

Chinese Office Action for Chinese Application No. 202080049021.6 dated Sep. 19, 2023.

* cited by examiner

700

| $f$ (GHz) | $f_0$ (GHz) | $T$ (mK) | $T_{eff}$ (mK) |
|---|---|---|---|
| 6.9013 | 6.9071 | 22.02 | 4.93 |
| 6.9752 | 6.9841 | 24.40 | 4.98 |
| 6.9221 | 6.9913 | 40.71 | 4.89 |
| 6.9563 | 7.0583 | 44.73 | 5.50 |

FIG. 7

ON-CHIP THERMOMETER FOR SUPERCONDUCTING QUANTUM COMPUTING DEVICES

BACKGROUND

The subject disclosure relates to one or more on-chip thermometers for superconducting quantum computing devices, and more specifically, the use of one or more superconducting resonators to measure the temperature of one or more quantum devices.

SUMMARY

The following presents a summary to provide a basic understanding of one or more embodiments of the invention. This summary is not intended to identify key or critical elements; or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate measuring the temperature of one or more quantum computing devices are described.

According to an embodiment, a system is provided. The system can comprise a temperature component that can determine a temperature of a superconducting resonator based on a frequency shift exhibited by the superconducting resonator due to a change in kinetic inductance with a change in temperature.

According to an embodiment, a system is provided. The system can comprise a temperature component that can determine a temperature of a superconducting resonator based on an estimated frequency experienced by the superconducting resonator at a reference temperature and an operating frequency of the superconducting resonator.

According to an embodiment, a computer-implemented method is provided. The computer-implemented method can comprise determining, by a system operatively coupled to a processor, a temperature of a superconducting resonator based on a frequency shift exhibited by the superconducting resonator due to a change in kinetic inductance with a change in temperature.

According to an embodiment, a computer-implemented method is provided. The computer-implemented method can comprise determining, by a system operatively coupled to a processor, a temperature of a superconducting resonator based on an estimated frequency experienced by the superconducting resonator at a reference temperature and an operating frequency of the superconducting resonator.

According to an embodiment, a computer program product for estimating the temperature of a superconducting device is provided. The computer program product can comprise a computer readable storage medium having program instructions embodied therewith, the program instructions executable by a processor to cause the processor to determine, by a system operatively coupled to the processor, a temperature of a superconducting resonator based on a frequency shift exhibited by the superconducting resonator due to a change in kinetic inductance with a change in temperature.

BRIEF DESCRIPTION OF THE DRAWINGS

FIG. 7 illustrates a diagram of an example, non-limiting chart that can demonstrate the efficacy of one or more systems in determining the temperature of one or more quantum computing devices in accordance with one or more embodiments described herein.

DETAILED DESCRIPTION

Figure 1:
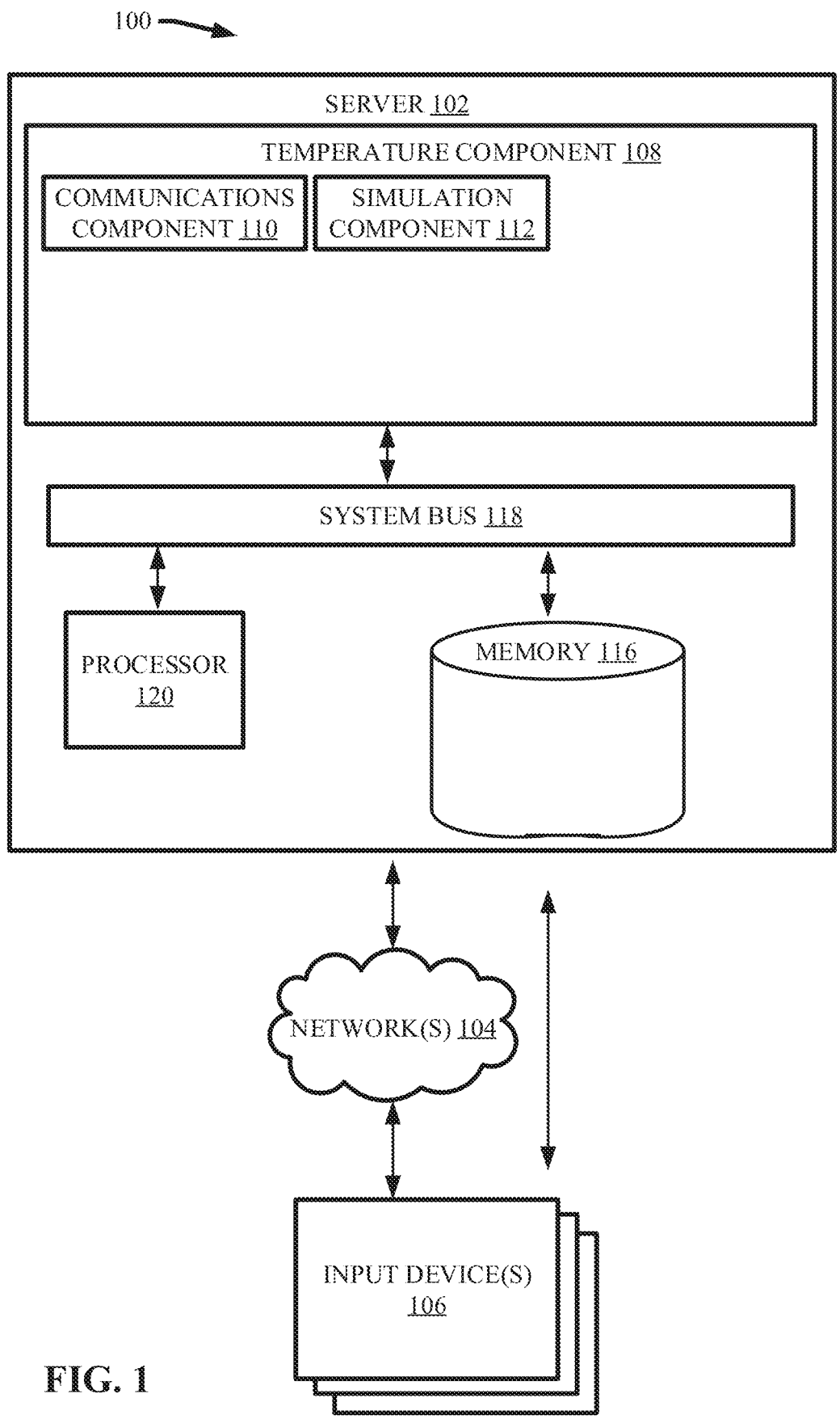
FIG. 1 illustrates a block diagram of an example, non-limiting system that can simulate an operation of one or more superconducting resonators at a reference temperature in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The longevity of superconductive qubits can be maximized when thermal energy is lower than quantum energy levels spacing of the qubits. Thus, determining the temperature of quantum computing devices can be a pivotal step in increasing their longevity. However, determining the temperature of quantum computing devices can be difficult at least because operation of the quantum computing devices can be affected by temperature measurements. Further, conventional thermodynamic means for determining temperature (e.g., conduction, convection, and/or radiation) can be ineffective due to one or more properties of the quantum computing devices.

Various embodiments of the present invention can be directed to computer processing systems, computer-implemented methods, apparatus and/or computer program products that facilitate the efficient, effective, and autonomous (e.g., without direct human guidance) determination of the temperature of a quantum computing device based on a frequency change exhibited by superconducting resonators due to a change in temperature. In one or more embodiments, one or more transmission lines comprised within the one or more quantum computing devices can be superconducting resonators. Further, due to kinetic inductance, as the temperature of the superconducting resonators increases, the frequency of the exhibited by the superconducting resonators can decrease. Thus, one or more embodiments described herein can determine the temperature of the superconducting resonators, and thereby the temperature of the quantum computing device, based on a frequency shift of the superconducting resonators.

For example, in one or more embodiments described herein can comprise determining an estimated frequency of the one or more superconducting resonators by simulating operation of the superconducting resonators at a reference temperature. Further, the operating frequency of the superconducting resonators can be measured while the superconducting resonators are operating. Thereby, the temperature of the superconducting resonators during operation can be determined based on the estimated frequency, the measured operating frequency, and/or a relationship between frequency shift and kinetic inductance.

The computer processing systems, computer-implemented methods, apparatus and/or computer program products employ hardware and/or software to solve problems that are highly technical in nature (e.g., determining the temperature of one or more quantum computing devices), that are not abstract and cannot be performed as a set of mental acts by a human. For example, an individual, or a plurality of individuals, cannot readily simulate operation of one or more superconducting resonators in a quantum computing device at a reference temperature.

FIG. 1 illustrates a block diagram of an example, non-limiting system 100 that can determine the temperature of one or more quantum computing devices. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devices 106. The server 102 can comprise temperature component 108. The temperature component 108 can further comprise communications component 110 and/or simulation component 112. Also, the server 102 can comprise or otherwise be associated with at least one memory 116. The server 102 can further comprise a system bus 118 that can couple to various components such as, but not limited to, the temperature component 108 and associated components, memory 116 and/or a processor 120. While a server 102 is illustrated in FIG. 1, in other embodiments, multiple devices of various types can be associated with or comprise the features shown in FIG. 1. For example, the server 102 can be embodied as an application-specific integrated circuit ("ASIC"). For instance, the processor 120 can be a microprocessor and/or the memory 116 can be comprised within one or more memory blocks of the ASIC structure. Further, the ASIC can include the temperature component 108, and associate components, to determine an operating temperature of one or more superconducting resonators in accordance the various embodiments described herein. Also, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the temperature component 108 can be provided on the one or more servers 102, it should be appreciated that the architecture of system 100 is not so limited. For example, the temperature component 108, or one or more components of temperature component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input information regarding one or more quantum computing devices into the system 100. For example, the inputted information can regard one or more characteristics of transmission lines comprised within the one or more quantum computing devices. Example characteristics can include, but are not limited to: the type of transmission lines, the material composition of the transmission lines, the placement of the transmission lines, one or more physical properties of the transmission lines, one or more chemical properties of the transmission lines, geometrical properties of the transmission lines (e.g., length, thickness, and/or two-dimensional/three-dimensional placement), a combination thereof, and/or the like.

In various embodiments, the one or more quantum computing devices can comprise one or more superconducting qubits operatively coupled to the one or more transmission lines. Further, the one or more transmission lines can be superconducting microwave resonators operating in a frequency range greater than or equal to 1 gigahertz (GHz) and less than or equal to 10 GHz. For instance, the one or more superconducting resonators can be microstrip transmission lines and/or coplanar waveguide transmission lines. Example materials that can be comprised within the one or more superconducting resonators can include, but are not limited to: pure type I superconductors (e.g., obeying the Bardeen-Cooper-Schrieffer ("BCS") theory), such as aluminum; pure type II superconductors (e.g., obeying the BCS theory), such as niobium; high thermal conductivity dielectrics, such as silicon; a combination thereof, and/or the like. A user of the system 100 can use the one or more input devices 106 and/or networks 104 to input information regarding, for example: how many superconducting resonators are comprised within the quantum computing device, the connectivity and/or position of the one or more superconducting resonators, the type of transmission lines, the material composition of the superconducting resonators, the frequency range of the superconducting resonators, a combination thereof, and/or the like.

The communications component 110 can receive the information inputted via the one or more input devices 106 and share the information with one or more components of the system 100. For example, the communications component 110 can share the information with the simulation component 112.

In one or more embodiments, the simulation component 112 can simulate operation of the one or more superconducting resonators to determine an estimated frequency exhibited by one or more superconducting resonators (e.g., transmission lines) of the one or more quantum computing devices at a reference temperature. The simulation component 112 can assume standard operating conditions for operating the superconducting resonators within the quantum computing device. For example, the thermal energy can be lower than quantum energy levels spacing to prevent thermal noise, and/or the quantum energy levels spacing can be lower than a superconducting energy gap to prevent the creation of quasiparticles. Additionally, in one or more embodiments the simulation component 112 can assume that the one or more subject transmission lines can be superconducting resonators with an operating frequency greater than or equal to 1 GHz and less than or equal to 10 GHz.

In various embodiments, the simulation component 112 can use a perfect electric conductor ("PEC") model to determine an estimated frequency of the subject superconducting resonator at the reference temperature. The reference temperature can be a temperature at which a kinetic inductance value for the superconducting resonator is known. For example, the reference temperature can be zero Kelvin (K). For instance, the simulation component 112 can determine a simulation frequency (e.g., represented by "$f_1$") of one or more superconducting resonators in accordance with Equation 1, presented below.

$$f_1 = \frac{1}{2\pi\sqrt{LC}} \quad (1)$$

Wherein "L" can represent the inductance of the subject superconducting resonator, and/or "C" can represent the capacitance of the subject superconducting resonator.

However, the simulated operation can lack accountability for the kinetic inductance (e.g., a superconducting quantum effect) experienced by the one or more superconducting resonators. In one or more embodiments, the simulation component 112 can further adjust the simulation frequency (e.g., represented by "$f_1$") to determine the estimated frequency (e.g., represented by "$f_0$") of the one or more superconducting resonators. For instance, the simulation component 112 can determine the estimated frequency (e.g., represented by "$f_0$") in accordance with Equations 2 and/or 3, presented below.

$$f_0 = \frac{1}{2\pi\sqrt{L_{T0}C}} \quad (2)$$

$$L_{T0} = L + L_k(0) \quad (3)$$

Wherein "$L_k(0)$" can represent the kinetic inductance of the superconducting resonator at a reference temperature of 0 K.

Figure 2:
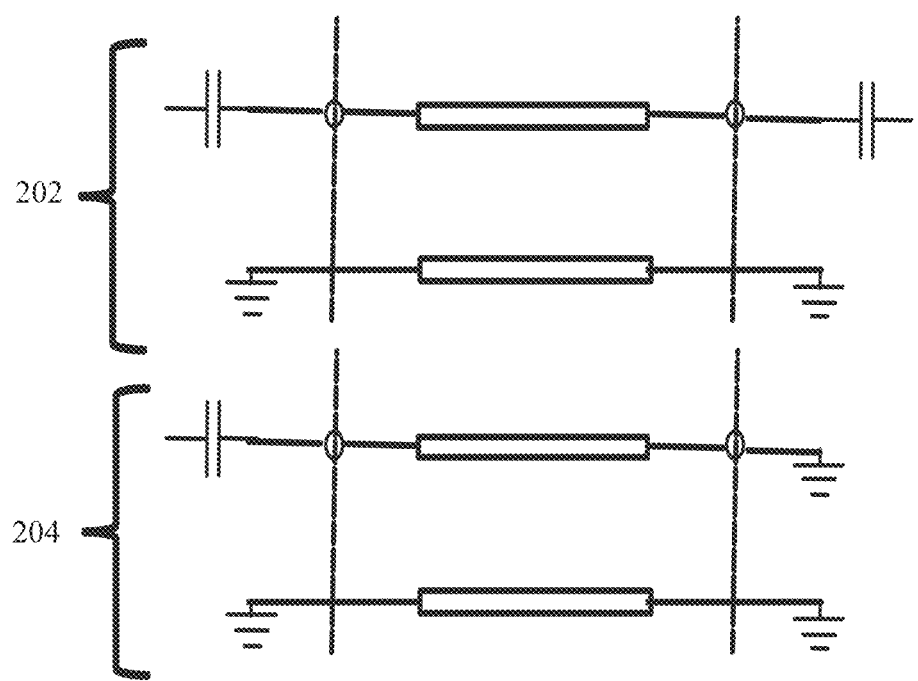
FIG. 2 illustrates a diagram of example, non-limiting superconducting resonator structures that can be utilized to determine the temperature of one or more quantum computing devices in accordance with one or more embodiments described herein.

FIG. 2 illustrates a diagram of example, non-limiting transmission line structures that can be characterized by the information inputted via the one or more input devices 106 and/or utilized to simulate operation of the one or more quantum computing devices in accordance with one or more embodiments described herein. Repetitive description of like elements employed in other embodiments described herein is omitted for sake of brevity.

As shown in FIG. 2, a first transmission line structure 202 that can serve as one or more of the superconducting resonators described herein can be a half wavelength transmission line (e.g., characterized by an electrical length that is one half wavelength long, or a multiple of one half wavelength, commonly represented by "λ/2"). For example, the first transmission line structure 202 can be closed by two capacitors in series (e.g., as shown in FIG. 2). A second transmission line structure 204 that can serve as one or more of the superconducting resonators described herein can be a quarter wavelength transmission line (e.g., characterized by an electrical length that is one quarter wavelength long, or a multiple of one quarter wavelength, commonly represented by "λ/4"). For example, the second transmission line structure 204 can comprise a first side that is capacitively coupled while a second side is connected to ground (e.g., as shown in FIG. 2).

Figure 3:
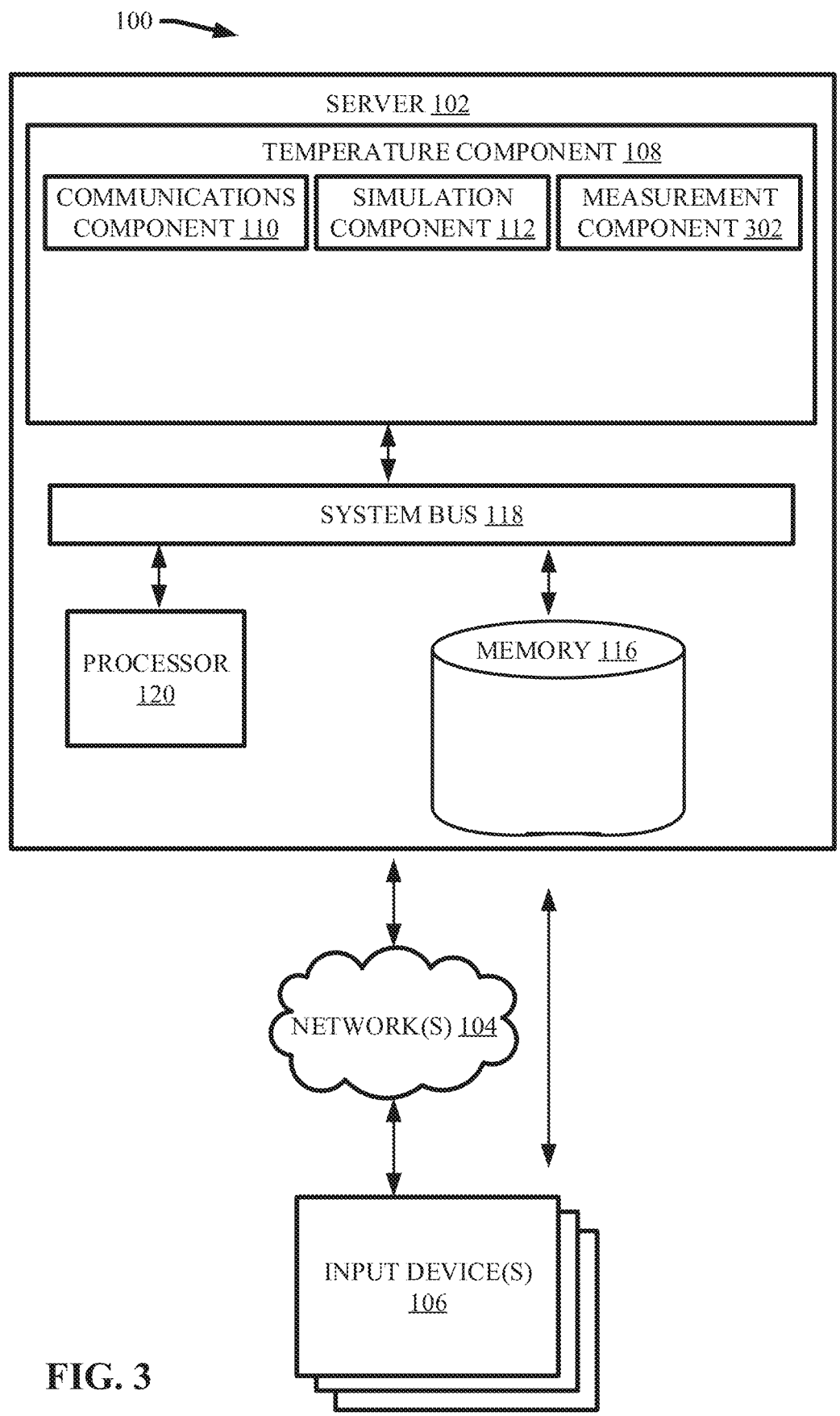
FIG. 3 illustrates a block diagram of an example, non-limiting system that can measure an operating frequency of one or more superconducting resonators in accordance with one or more embodiments described herein.

FIG. 3 illustrates a diagram of the example, non-limiting system 100 further comprising measurement component 302 in accordance with one or more embodiments described herein. Repetitive description of like elements employed in other embodiments described herein is omitted for sake of brevity.

In one or more embodiments, the measurement component 302 can measure the actual operating frequency (e.g., represented by "f") of the one or more subject superconducting resonators comprised within the one or more quantum computing devices. For instance, the measurement component 302 can apply one or more microwave signals to the one or more superconducting resonators to facilitate measurement of the operating frequency (e.g., represented by "f"). Example sensors and/or measurement technologies that can be comprised within the measurement component 302, and/or communicate with the measurement component 302, can include, but are not limited to: network and/or vector analyzers ("VNA"), oscilloscopes, Rabi interferometry, Ramsey interferometry, a combination thereof, and/or the like. Further, the measured operating frequency (e.g., represented by "f") can be characterized by Equation 4 and/or 5, presented below.

$$f = \frac{1}{2\pi\sqrt{L_T C}} \qquad (4)$$

$$L_T = L + L_k(T) \qquad (5)$$

Wherein "T" can represent an operating temperature of the subject superconducting resonator (e.g., a temperature achieved by the superconducting resonator during operation of the one or more quantum computing devices), and/or "$L_k(T)$" can represent the kinetic inductance experienced by the subject superconducting resonator at the operating temperature.

Figure 4:
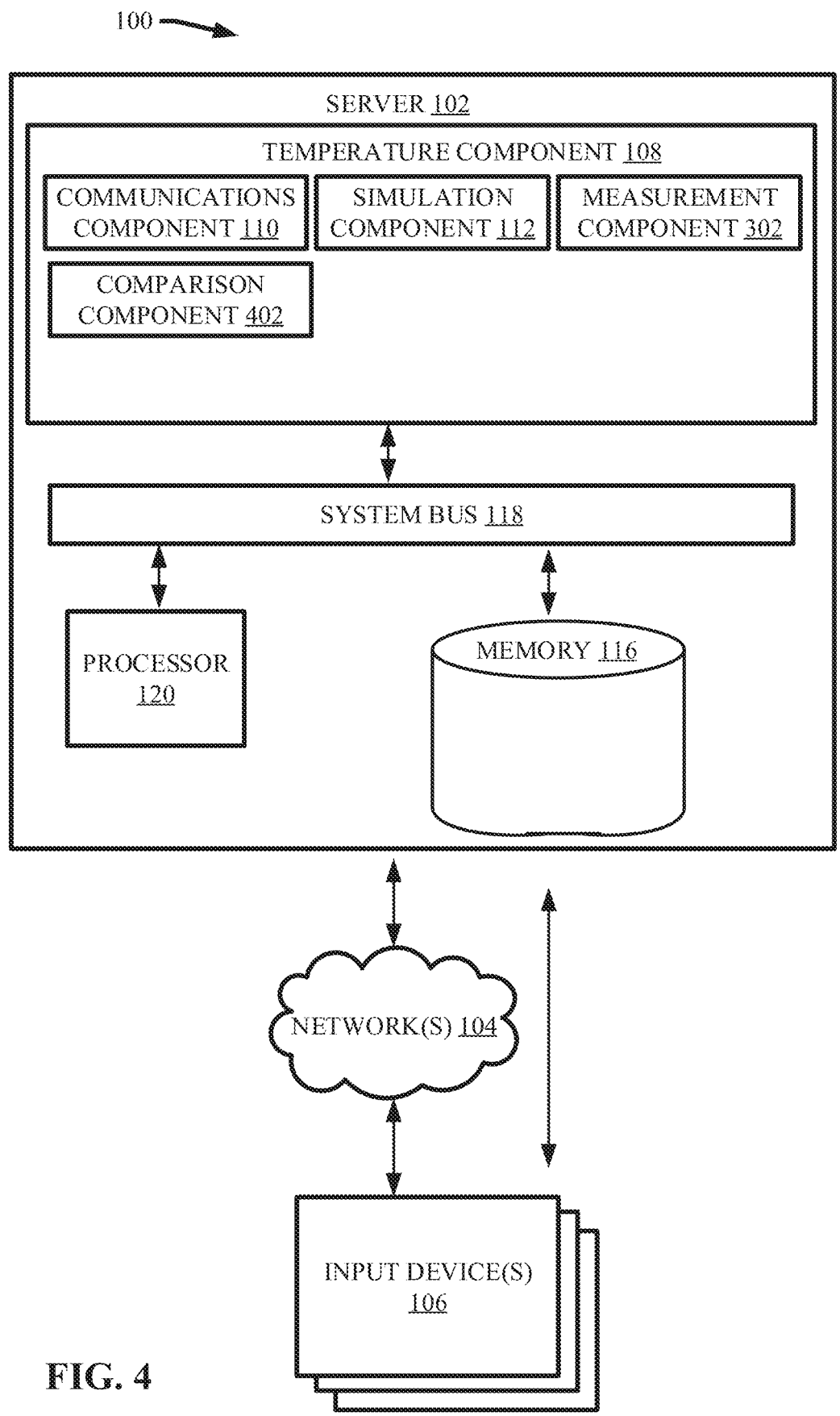
FIG. 4 illustrates a block diagram of an example, non-limiting system that can compare one or more estimated frequencies and/or measure operating frequencies of one or more superconducting resonators in accordance with one or more embodiments described herein.

FIG. 4 illustrates a diagram of the example, non-limiting system 100 further comprising comparison component 402 in accordance with one or more embodiments described herein. Repetitive description of like elements employed in other embodiments described herein is omitted for sake of brevity. In various embodiments, the comparison component 402 can compare the estimated frequency (e.g., represented by "$f_0$") and the measured operating frequency (e.g., represented by "f") to identify one or more potential errors.

At least because kinetic inductance increases with temperature, the measured operating frequency (e.g., measured by the measurement component 302) can be smaller than the estimated frequency (e.g., determined by the simulation component 112). For example, the temperature at which the one or more subject superconducting resonators operate can be greater than the reference temperature utilized to determine the estimated frequency. An instance wherein the measured operating frequency is larger than the estimated frequency can be indicative of an error in the simulation performed by the simulation component 112, an error in the measurement performed by the measurement component 302, and/or a need to utilize a lower reference temperature. In one or more embodiments, the simulation and/or determinations performed by the simulation component 112 can be repeated and/or altered in response to the comparison component 402 determining that the operating frequency is larger than the estimated frequency.

Figure 5:
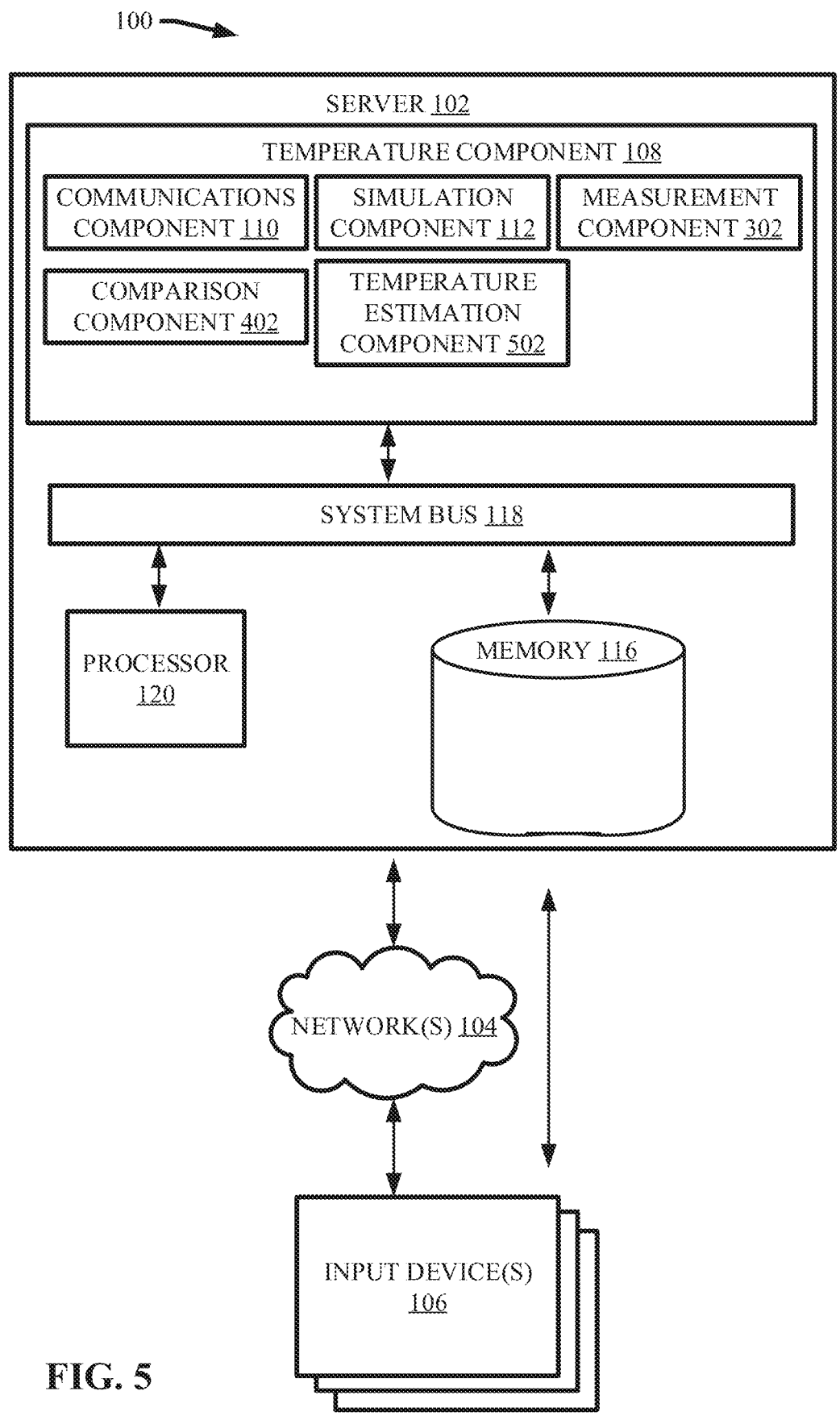
FIG. 5 illustrates a block diagram of an example, non-limiting system that can determine a temperature of one or more quantum computing devices based on a frequency shift associated with a change in temperature in accordance with one or more embodiments described herein.

FIG. 5 illustrates a diagram of the example, non-limiting system 100 further comprising temperature estimation component 502 in accordance with one or more embodiments described herein. Repetitive description of like elements employed in other embodiments described herein is omitted for sake of brevity. In various embodiments, the temperature estimation component 502 can determine the temperature achieved by the one or more superconducting resonators while operating.

For example, the temperature estimation component 502 can determine the operating temperature (e.g., represented by "T") achieved by the one or more subject superconducting resonators during operation of the one or more quantum computing devices. The temperature estimation component 502 can determine the operating temperature (e.g., represented by "T") of the superconducting resonators based on the measured operating frequency (e.g., represented by "f") and/or estimated frequency (e.g., represented by "$f_0$") of the one or more superconducting resonators. For example, the temperature estimation component 502 can determine the operating temperature (e.g., represented by "T") of the superconducting resonators in accordance with Equations 6 and/or 7, presented below.

$$T = \frac{1}{T_C}\sqrt[4]{1 - \left(\frac{f}{f_0}\right)^2} \pm T_{err} \qquad (6)$$

$$T_{err} \cong 2\pi\hbar(f_0 - f)/k_b \qquad (7)$$

Wherein "$k_b$" can represent Boltzmann constant, "$\hbar$" can represent Planck constant, "$T_{err}$" can represent an upper bound for temperature measurement error based on quantum energy variation due to a microwave signal being applied to the one or more superconducting resonators (e.g., to facilitate measuring the operating frequency), and/or "$T_C$" can represent the superconducting material's critical temperature (e.g., a temperature below which the material becomes a superconductor). Also, the temperatures can be represented in units of Kelvin.

In various embodiments, the temperature estimation component 502 can further determine the temperature of the one or more quantum computing devices during operation. For example, the temperature of the one or more quantum computing devices can be based on the temperature of the one or more superconducting resonators comprised within the one or more quantum computing devices. For instance, the temperature of the one or more quantum computing devices can be a function of: how many superconducting resonators are comprised within the one or more quantum computing devices, the position and/or connectivity of the one or more superconducting resonators, and/or the temperature of the one or more superconducting resonators.

Figure 6:
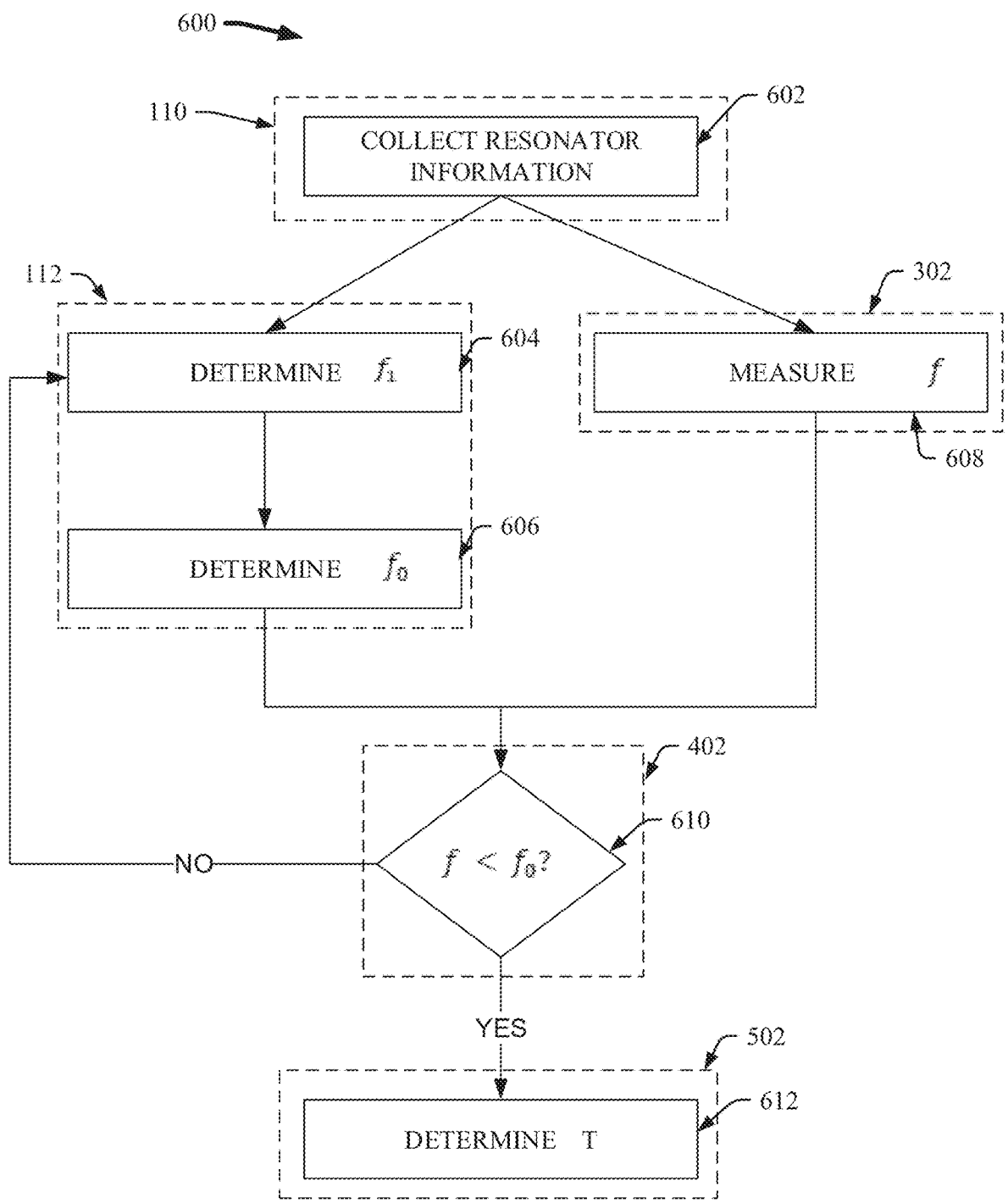
FIG. 6 illustrates a diagram of an example, non-limiting operating process that can be implemented by one or more systems to determine a temperature of one or more quantum computing devices in accordance with one or more embodiments described herein.

FIG. 6 illustrates a diagram of an example, non-limiting operating process 600 that can be implemented by the system 100 to determine a temperature of the one or more superconducting resonators in accordance with one or more embodiments described herein. Repetitive description of like elements employed in other embodiments described herein is omitted for sake of brevity.

At 602, the operating process 600 can comprise collecting information regarding the one or more superconducting resonators comprised within the one or more quantum computing devices. As described herein, the information can be entered into the system 100 via the one or more input devices 106 and/or networks 104. For example, the communications component 110 can receive the information from the one or more input devices 106 and/or distribute the information to one or more components of the system 100 (e.g., one or more associate components of the temperature component 108).

At 604, the operating process 600 can comprise determining the simulation frequency (e.g., represented by "$f_1$" of the one or more superconducting resonators. For example, the simulation component 112 can simulate operation of the one or more superconducting resonators at the reference temperature to facilitate determining the simulation frequency in accordance with Equation 1.

At 606, the operating process 600 can also comprise determining the estimated frequency (e.g., represented by "$f_0$") of the one or more superconducting resonators at a reference temperature based on the simulation frequency. For example, the simulation component 112 determine the estimated frequency in accordance with Equations 2 and/or 3. In one or more embodiments, the reference temperature can be 0 K.

At 608, the operating process 600 can comprise measuring the operating frequency (e.g., represented by "f") of the one or more superconducting resonators during operation. For example, the measurement component 302 can measure the operating frequency using one or more microwave signals. The operating frequency can be characterized by Equations 4 and/or 5.

At 610, the operating process 600 can comprise determining whether the operating frequency is less than the estimated frequency. For example, the comparison component 402 can compare the measured operating frequency and the determined estimated frequency. In one or more embodiments, the comparison component 402 can instruct the simulation component to determine a new simulation frequency and/or estimated frequency based on the comparison at 610 determining that the operating frequency is larger than the subject estimated frequency. For instance, the simulation component 112 can reperform the simulated operation of the superconducting resonators with one or more alternate simulation settings and/or determine the estimated frequency with regards to an alternate reference temperature. In response to the comparison at 610 determining that the operating frequency is less than the estimated frequency, the operating process 600 can proceed to 612.

At 612, the operating process 600 can comprise determining an operating temperature (e.g., represented by "T") of the one or more superconducting resonators based on the estimated frequency and/or the operating frequency. For example, the temperature estimation component 502 can determine the operating temperature of the one or more superconducting resonators in accordance with Equations 6 and/or 7.

FIG. 7 illustrates a diagram of an example, non-limiting chart 700 that can depict the efficacy of the operating process 600 in accordance with one or more embodiments described herein. Repetitive description of like elements employed in other embodiments described herein is omitted for sake of brevity. For example, the system 100 can implement the operating process 600 to derive the values comprised within chart 700. The estimated frequency shown in FIG. 7 can be determined with regards to a reference temperature of 0 K. As shown in FIG. 7, a frequency shift between the estimated frequency and the operating frequency can correlate to a temperature change exhibited by the one or more superconducting resonators. For example, as the operating frequency of the one or more superconducting resonators decreases with respect to the estimated frequency, the temperature of the one or more superconducting resonators can increase with respect to the reference temperature.

Figure 8:
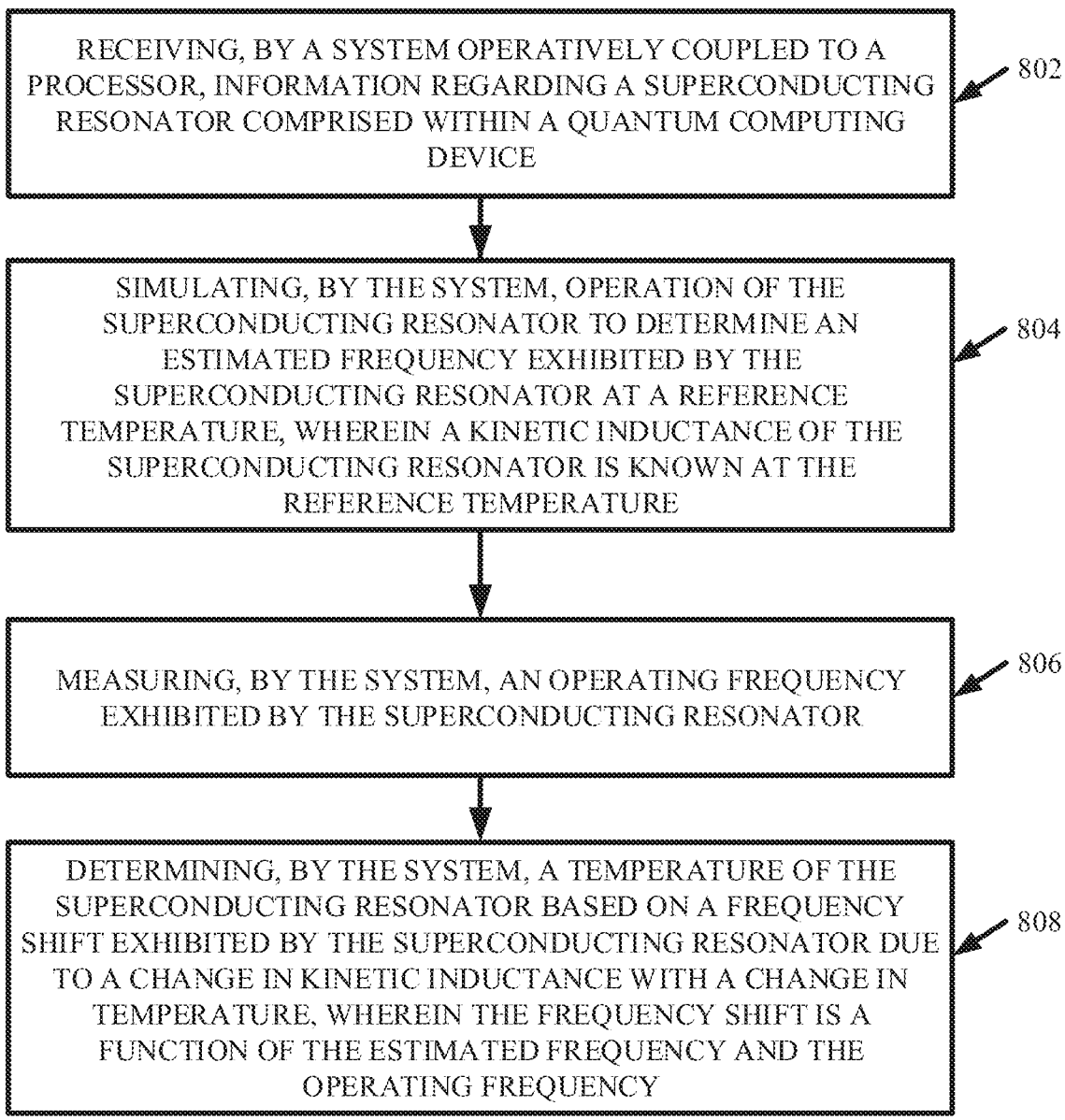
FIG. 8 illustrates a flow diagram of an example, non-limiting method that can facilitate determining a temperature of one or more quantum computing devices in accordance with one or more embodiments described herein.

FIG. 8 illustrates a diagram of an example, non-limiting method 800 that can facilitate determining the temperature of one or more quantum computing devices in accordance with one or more embodiments described herein. Repetitive description of like elements employed in other embodiments described herein is omitted for sake of brevity.

At 802, the method 800 can comprise receiving (e.g., via communications component 110), by a system 100 operatively coupled to one or more processors 120, information regarding one or more superconducting resonators comprised within one or more quantum computing devices. For example, the one or more resonators can be transmission lines comprised within the one or more quantum computing devices. Further, the information can regard, for example: the type of transmission lines, the material composition of the transmission lines, the placement of the transmission lines, one or more physical properties of the transmission lines, one or more chemical properties of the transmission lines, geometrical properties of the transmission lines (e.g., length, thickness, and/or two-dimensional/three-dimensional placement), a combination thereof, and/or the like.

At 804, the method 800 can comprise simulating (e.g., via simulation component 112), by the system 100, operation of the one or more superconducting resonators to determine an estimated frequency exhibited by the one or more superconducting resonators at a reference temperature, wherein a kinetic inductance of the one or more superconducting resonators can be known at the reference temperature. For example, the simulating at 804 can be performed using one or more PEC models under standard operating conditions to determine a simulation frequency in accordance with Equation 1. Further, the simulation frequency can be modified to determine the estimated frequency at the reference temperature in accordance with Equations 2 and/or 3. In one or more embodiments, the reference temperature can be 0 K.

At 806, the method 800 can comprise measuring (e.g., via measurement component 302), by the system 100, an operating frequency exhibited by the one or more superconducting resonators during operating of the one or more quantum computing devices. For example, the operating frequency can be characterized by Equations 4 and/or 5.

At 808, the method 800 can comprise determining (e.g., via temperature estimation component 502), by the system 100, a temperature of the one or more superconducting resonators based on a frequency shift exhibited by the one or more superconducting resonators due to a change in kinetic inductance with a change in temperature. Further, the frequency shift can be a function of the estimated frequency determined at 804 and/or the operating frequency measured at 806. For example, the temperature can be determined in accordance with Equations 6 and/or 7.

Figure 9:
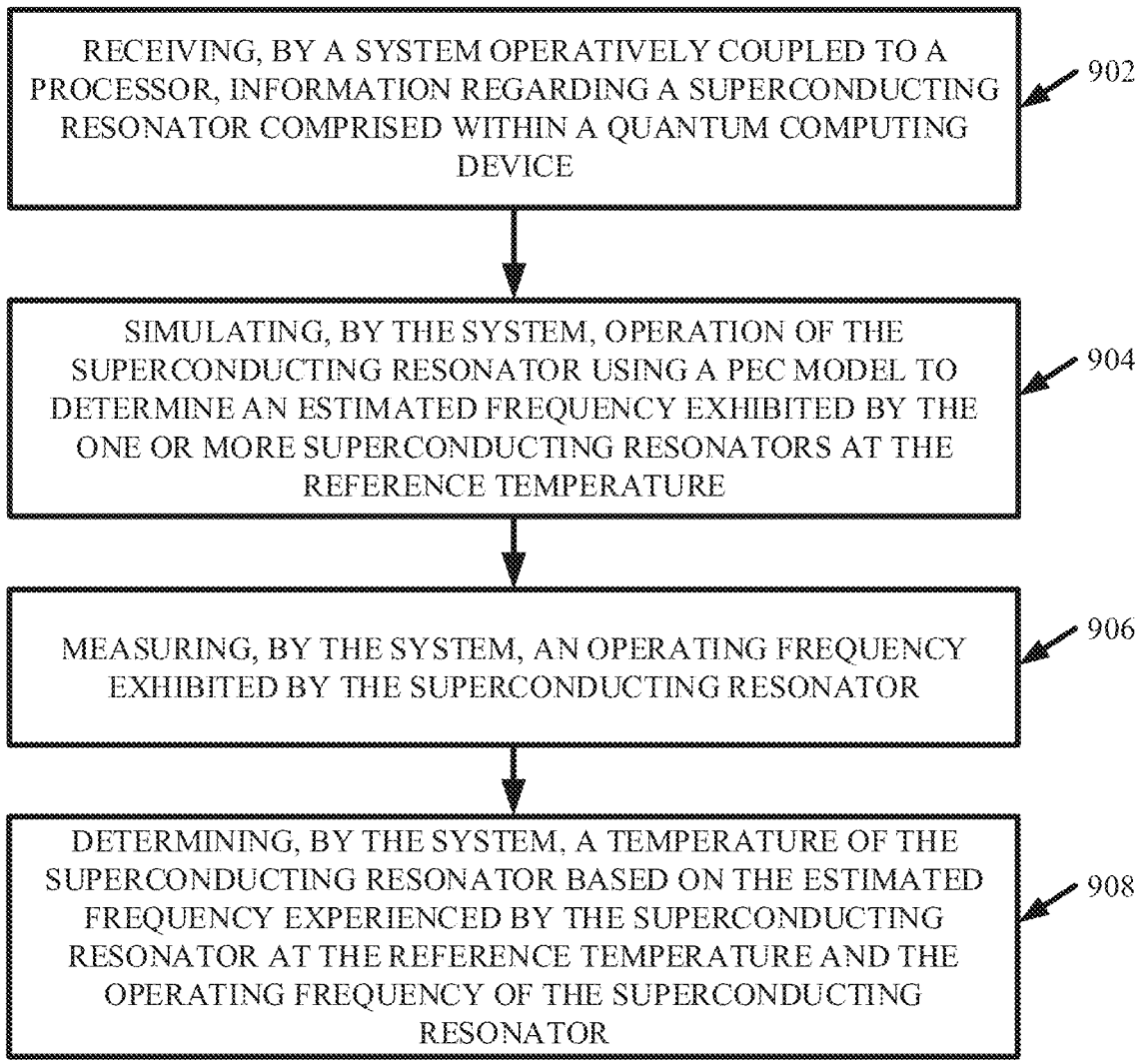
FIG. 9 illustrates a flow diagram of an example, non-limiting method that can facilitate determining a temperature of one or more quantum computing devices in accordance with one or more embodiments described herein.

FIG. 9 illustrates a diagram of an example, non-limiting method 900 that can facilitate determining the temperature of one or more quantum computing devices in accordance with one or more embodiments described herein. Repetitive description of like elements employed in other embodiments described herein is omitted for sake of brevity.

At 902, the method 900 can comprise receiving (e.g., via communications component 110), by a system 100 operatively coupled to one or more processors 120, information regarding one or more superconducting resonators comprised within one or more quantum computing devices. For example, the one or more resonators can be transmission lines comprised within the one or more quantum computing devices. Further, the information can regard, for example: the type of transmission lines, the material composition of the transmission lines, the placement of the transmission lines, one or more physical properties of the transmission lines, one or more chemical properties of the transmission lines, geometrical properties of the transmission lines (e.g., length, thickness, and/or two-dimensional/three-dimensional placement), a combination thereof, and/or the like.

At 904, the method 900 can comprise simulating (e.g., via simulation component 112), by the system 100, operation of the one or more superconducting resonators using one or more PEC models to determine an estimated frequency exhibited by the one or more superconducting resonators at a reference temperature. For example, operation of the one or more superconducting resonators can be simulated to determine a simulation frequency in accordance with Equation 1. Further, the simulation frequency can be adjusted to account for kinetic inductance at a reference temperature to determine the estimated frequency in accordance with Equations 2 and/or 3.

At 906, the method 900 can comprise measuring (e.g., via measurement component 302), by the system 100, an operating frequency exhibited by the or more superconducting resonators during operation of the one or more quantum computing devices. For example, one or more microwave signals can be applied to the one or more superconducting resonators during operation to facilitate the measuring at 906. Additionally, the operating frequency can be characterized by Equations 4 and/or 5.

At 908, the method 900 can comprise determining (e.g., via temperature estimation component 502), by the system 100, a temperature of the one or more superconducting resonators based on the estimated frequency experienced by the one or more superconducting resonators at the reference temperature and/or the operating frequency of the one or more superconducting resonators. For example, the determining at 908 can be facilitated by a relationship between a frequency shift and a change in kinetic inductance due to a change in temperature. For instance, the temperature can be determined in accordance with Equations 6 and/or 7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
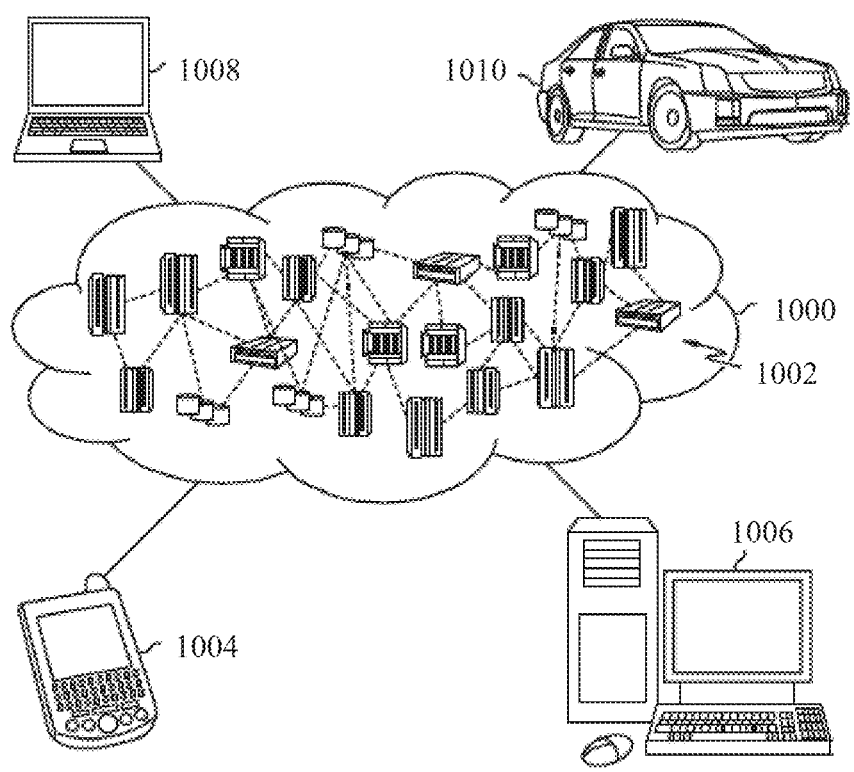
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
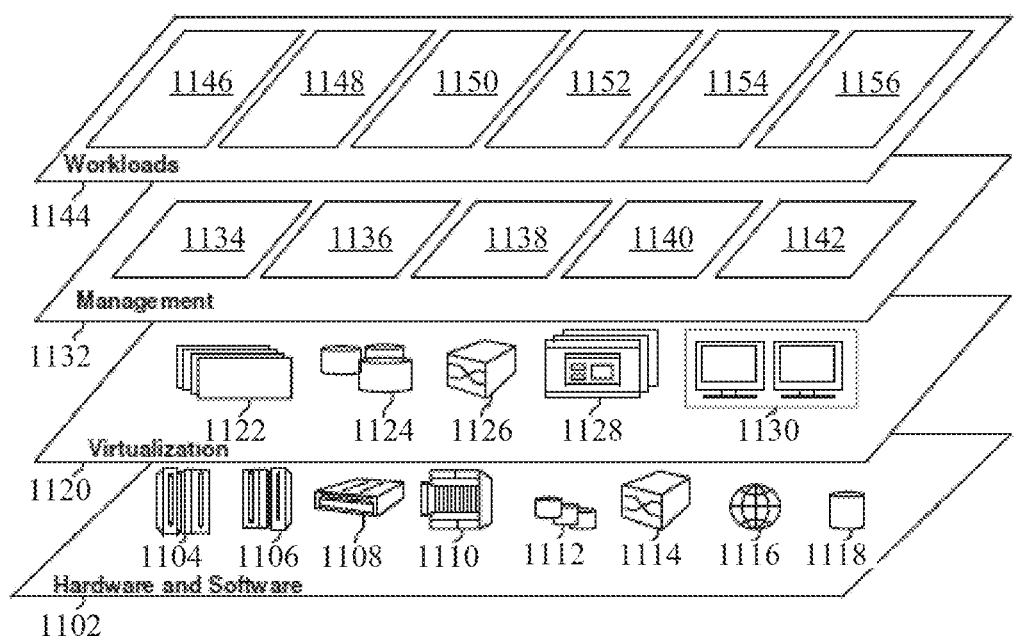
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and/or temperature determinations 1156. Various embodiments of the present invention can utilize the cloud computing environment described with reference to FIGS. 10 and 11 to determine the temperature of one or more superconducting resonators comprised within one or more quantum computing devices (e.g., to facilitate simulating operation of the one or more superconducting resonators using one or more PEC models).

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
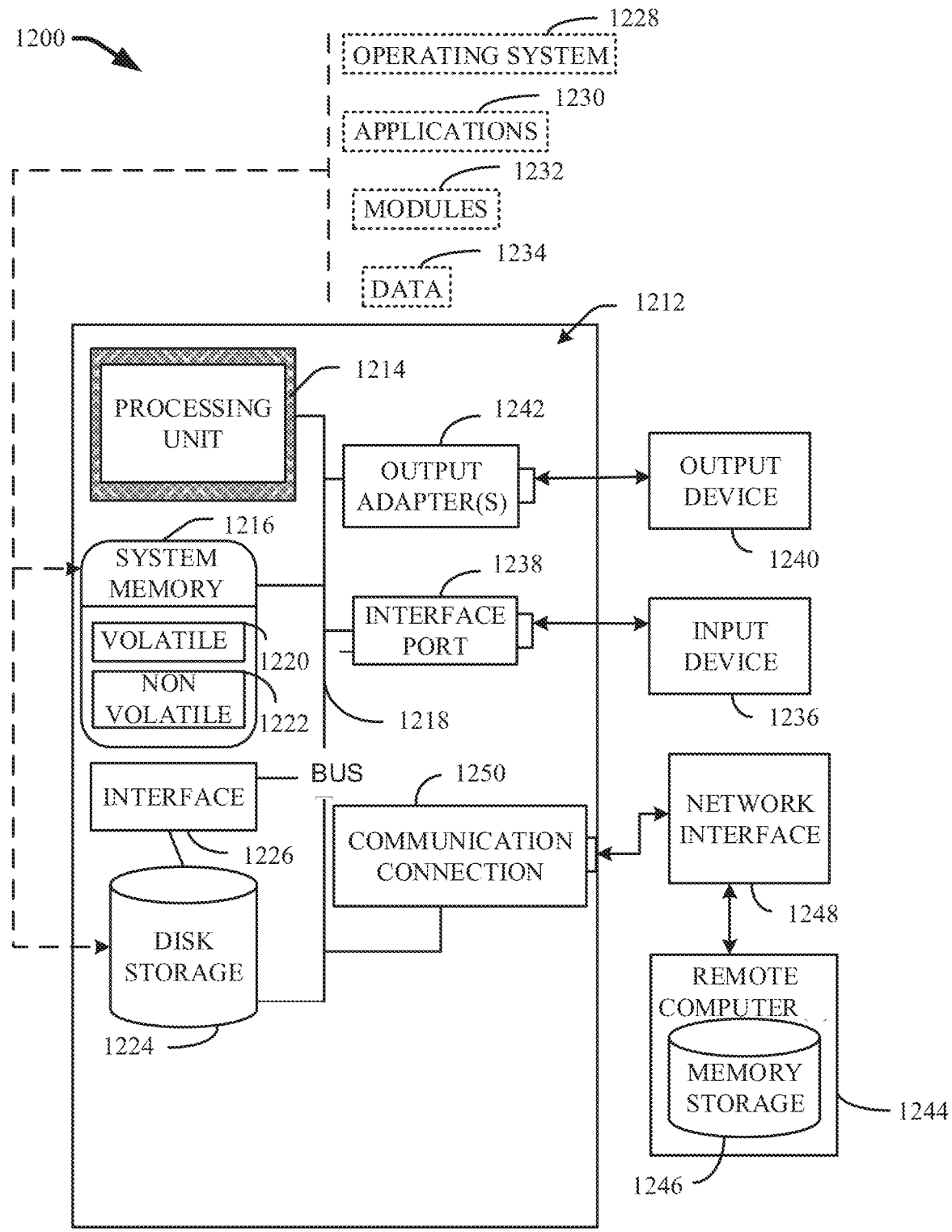
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor-based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a superconducting resonator coupled to a superconducting qubit;
   a memory that stores computer executable components; and
   a processor, operably coupled to the memory, and that executes the computer executable components, wherein the computer executable components comprise:
   a temperature component configured to determine a temperature of the superconducting resonator at an operating frequency based on a frequency shift exhibited by the superconducting resonator due to a change in kinetic inductance with a change in temperature, wherein the frequency shift exhibited by the superconducting resonator is between an estimated frequency experienced by the superconducting resonator at a reference temperature and the operating frequency.

2. The system of claim 1, wherein the superconducting resonator is a superconducting transmission line positioned on a dielectric substrate, and wherein the superconducting resonator comprises at least one member selected from a group consisting of: a pure type-I metal, a pure type-II metal, and a high thermal conductivity dielectric.

3. The system of claim 2, wherein the superconducting transmission line is selected from a second group consisting of a microstrip transmission line and a coplanar waveguide transmission line.

4. The system of claim 1, further comprising:
   a simulation component configured to simulate operation of the superconducting resonator to determine the estimated frequency exhibited by the superconducting resonator at the reference temperature, wherein a kinetic inductance of the superconducting resonator is known at the reference temperature.

5. The system of claim 4, further comprising:
   a measurement component configured to measure the operating frequency exhibited by the superconducting resonator.

6. A computer-implemented method, comprising:
   determining, by a system operatively coupled to a processor, a temperature of a superconducting resonator, coupled to a superconducting qubit, at an operating frequency based on a frequency shift exhibited by the superconducting resonator due to a change in kinetic inductance with a change in temperature, wherein the frequency shift exhibited by the superconducting resonator is between an estimated frequency experienced by the superconducting resonator at a reference temperature and the operating frequency of the superconducting resonator.

7. The computer-implemented method of claim 6, wherein the superconducting resonator is a superconducting transmission line of a superconducting device.

8. The computer-implemented method of claim 6, further comprising:
   simulating, by the system, operation of the superconducting resonator to determine the estimated frequency exhibited by the superconducting resonator at the reference temperature, wherein a kinetic inductance of the superconducting resonator is known at the reference temperature.

9. A computer program product for estimating the temperature of a superconducting device, the computer program product comprising a computer readable storage medium having program instructions embodied therewith, the program instructions executable by a processor to cause the processor to:
   determine, by a system operatively coupled to the processor, a temperature of a superconducting resonator, coupled to a superconducting qubit, at an operating frequency based on a frequency shift exhibited by the superconducting resonator due to a change in kinetic inductance with a change in temperature, wherein the frequency shift exhibited by the superconducting resonator is between an estimated frequency experienced by the superconducting resonator at a reference temperature and the operating frequency of the superconducting resonator.

10. The computer program product of claim 9, wherein the superconducting resonator is a superconducting transmission line positioned on a dielectric substrate.

11. The computer program product of claim 9, wherein the program instructions further cause the processor to:
   simulate, by the system, operation of the superconducting resonator to determine the estimated frequency exhibited by the superconducting resonator at the reference temperature, wherein a kinetic inductance of the superconducting resonator is known at the reference temperature.

12. The computer program product of claim 11, wherein the operation of the superconducting resonator is simulated using a perfect electric conductor model.

13. The computer program product of claim 11, wherein simulating the operation of the superconducting resonator is facilitated by a cloud computing environment.

14. The computer program product of claim 11, wherein the program instructions further cause the processor to:
   measure, by the system, the operating frequency exhibited by the superconducting resonator.

15. The computer program product of claim 14, wherein the program instructions further cause the processor to:
   determine, by the system, a bound for temperature measurement error based on a quantum energy variation due to a microwave signal applied to the superconducting resonator to measure the operating frequency.

16. The computer-implemented method of claim 8, further comprising:
   measuring, by the system, the operating frequency exhibited by the superconducting resonator.

* * * * *